United States Patent [19]

Herrera

[11] Patent Number: 5,285,941
[45] Date of Patent: Feb. 15, 1994

[54] CAR STORAGE SYSTEM

[76] Inventor: Paul L. Herrera, 327 Savannah, San Antonio, Tex. 78213

[21] Appl. No.: 965,198

[22] Filed: Oct. 23, 1992

[51] Int. Cl.⁵ .......................... B60R 7/08; B60R 9/04
[52] U.S. Cl. .................... 224/282; 224/311; 224/314; 224/319; 224/320; 224/42.46 R
[58] Field of Search .......................... 224/311-314, 224/319-321, 42.45 R, 42.45 A, 42.46 R, 42.46 A, 282, 42.01, 324

[56] References Cited

U.S. PATENT DOCUMENTS

| | | | |
|---|---|---|---|
| 2,523,857 | 9/1950 | Baumgardt | 224/320 |
| 2,569,678 | 10/1951 | Larson et al. | 224/313 |
| 2,678,249 | 5/1954 | Rhoads | 224/311 X |
| 2,768,590 | 10/1956 | Otto et al. | 224/311 X |
| 2,829,813 | 4/1958 | Sebell | 224/311 |
| 2,929,539 | 3/1960 | Safreno | 224/311 |
| 3,049,273 | 8/1962 | Crane | 224/311 |
| 3,181,754 | 5/1965 | Best | 224/311 |
| 3,847,316 | 11/1974 | McInnes | 224/311 |
| 3,856,192 | 12/1974 | Nelson | 224/311 |
| 4,180,299 | 12/1979 | Tolerson | 224/311 |
| 4,441,641 | 4/1984 | Thompson | 224/311 |
| 4,449,656 | 5/1984 | Wouden | 224/320 |
| 5,054,669 | 10/1991 | Zimbardi et al. | 224/42.45 R |

Primary Examiner—Ernest G. Cusick
Attorney, Agent, or Firm—Donald R. Comuzzi; Christopher L. Makay

[57] ABSTRACT

A car storage system is disclosed which mounts to the ceiling of an automobile to provide storage for small items carried by a vehicle operator such as cassette tapes, compact discs, gloves, sunglasses, nasal tissue, and/or maps. The car storage system is adjustably mountable to the ceiling of an automobile such that any of the above items are easily within reach of a vehicle operator. The car storage system comprises a support member which is adjustable to any ceiling width and is mounted using pivotable flanges secured behind the trim molding normally placed about a vehicle's ceiling. A storage member which comprises a plurality of individual storage compartments is removably connected to the support member in order to provide the storage area for any of the above items.

8 Claims, 3 Drawing Sheets

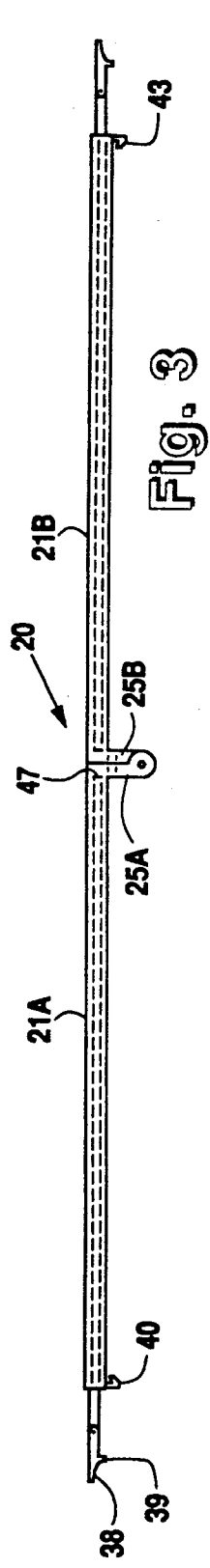
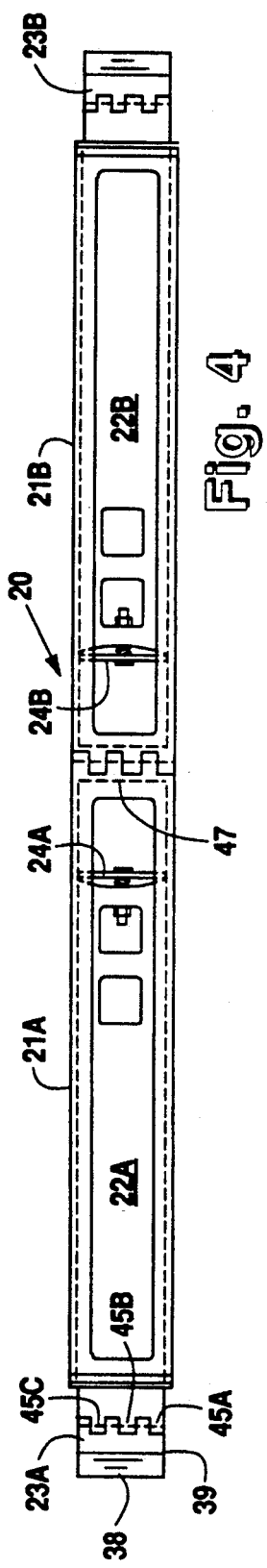
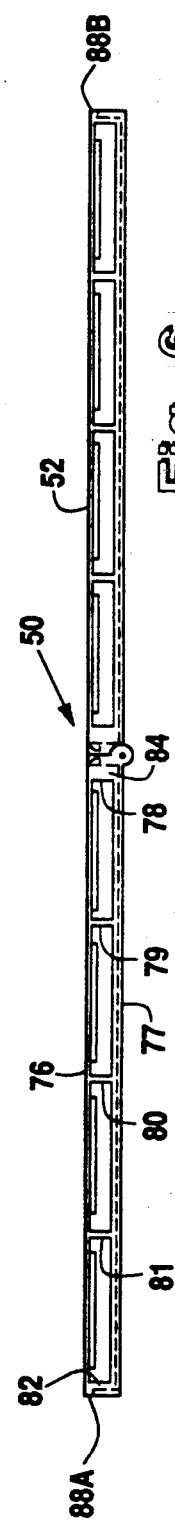
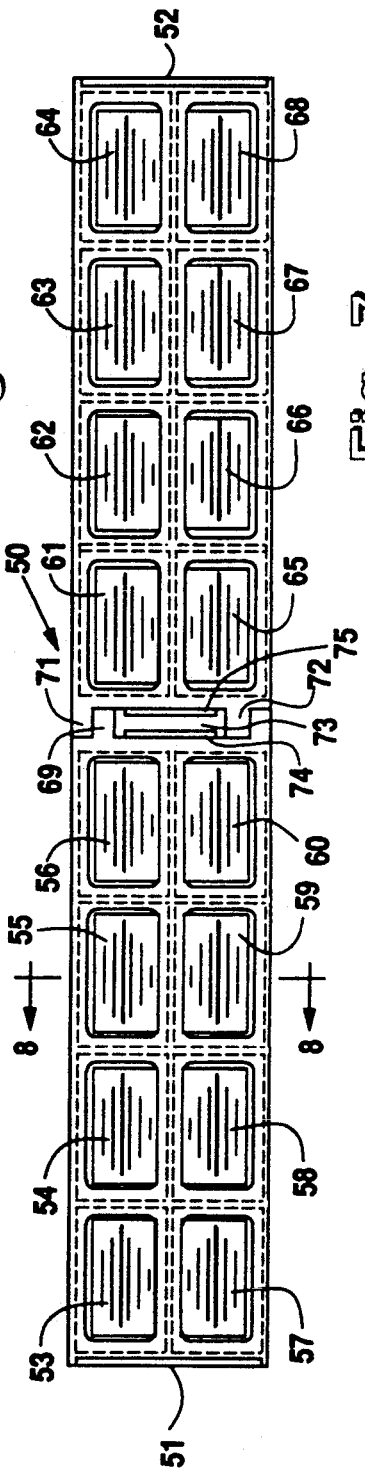

CAR STORAGE SYSTEM

BACKGROUND OF THE INVENTION

The present invention relates to an apparatus used for the storage of small items and, more particularly, but not by way of limitation, to an apparatus removably mounted to the ceiling of an automobile roof in a position above the heads of a vehicle's occupants across the ceiling from the driver's side to the passenger's side in order to provide storage for items normally carried within an automobile such as cassette tapes, compact discs, gloves, sunglasses, maps, nasal tissue, garage opener, mail, first aid kit, loose change, and/or hand towels.

In today's society, automobiles are more like second homes than a means of transportation. As such, people routinely carry large amounts of personal belongings within their automobiles. Unfortunately, storage space for smaller items which are easily lost is extremely limited in most of today's automobiles. Thus, small items such as cassette tapes, compact discs, maps, sunglasses, and gloves are left lying about the automobile where they be lost within the seats or out the door or they find their way to the floorboards where they are ruined under an occupant's feet.

Additionally, small personal items left laying about an automobile create a dangerous situation if the vehicle's driver wishes to find a particular object while driving. That is, if the item is not readily available, a driver may temporarily avert his/her eyes from the road in an attempt to locate the desired item. Seeking to locate an object within an automobile by averting one's eyes from the road produces an extremely dangerous situation because failure to pay full attention to the road is likely to be the cause of an accident resulting in the injury of the driver, innocent third parties, or both.

The above situation is clearly exemplified when the item in the car is a cassette tape or compact disc. With the proliferation of radios which are outfitted with cassette tape players or compact disc players, the trend is to possess a large personal music collection readily available in one's automobile. Normally, these collections consist of cassette tapes or compact discs either spread throughout an automobile's interior or placed in a cassette tape or compact disc carrying case which is located on one of the car's seats. Thus, a vehicle operator desiring to listen to his/her favorite song must either randomly grab tapes or CD's stuck in various the crevices in the car's interior or open the carrying case placed on one of the car's seats and search through the tapes or CD's held within until the desired one is found. In either case, the driver's will take his/her eyes off the road for what may amount to an extended period of time just to find the desired tape or CD. Such a lack of attention to the road is unacceptable when safe driving is considered. Failure to pay proper attention while driving is a large cause of automobile accidents, and searching for items in a car such as cassette tapes or CD's certainly encourages a driver to avert his/her eyes from the road.

The present invention, therefore, provides an apparatus that overcomes the lack of storage within an automobile which causes small items to be ruined or lost and further creates the dangerous driver condition of failing to pay full attention to the road provoked when a small object which is not readily accessible must be located during vehicle operation.

SUMMARY OF THE INVENTION

The present invention is a car storage system which may be mounted to an automobile's ceiling in a position above the head of a vehicle operator across from the driver's side to the passenger's side. The car storage system of the present invention comprises an adjustable support member equipped with pivotable flanges which are designed to fit behind the molding which surrounds the edges of the ceilings in most automobiles. The car storage system of the present invention further comprises a storage member, comprised of a plurality of storage compartments, which is removably connected to the support member. To mount the car storage system of the present invention within an automobile, one of the pivotable flanges is positioned at an angle which will allow it to fit behind the ceiling molding, and then its edge is inserted behind the molding. Second, the support member is adjusted to the appropriate ceiling width. Finally, the flange opposite from the inserted flange is positioned at an angle which will also allow it to fit behind the ceiling molding, and then its edge is inserted behind the molding. Each flange edge is forced behind the ceiling molding to suspend the support member along the ceiling of the automobile from the driver's side to the passenger's side. Although the support member may be positioned at any point along the ceiling molding, it is normally desirable to place the support member slightly forward and above of the head of the vehicle operator. Finally, after the support member is in place, the storage member is connected to the support member and locked securely in position to complete the assembly of the car storage system of the present invention. Thus, the present invention provides a car storage system which furnishes a plurality of individual storage compartments which are easily accessible to a vehicle operator.

In use, the plurality of storage compartments which reside above the head of the vehicle operator may be filled with various items such as cassette tapes, compact discs, gloves, maps, sunglasses, hand towels, garage door openers, mail, loose change, and/or nasal tissue for easy access by the vehicle operator. With regard to cassette tapes, a vehicle operator may place all his/her favorite tapes in the storage compartments. By placing the tapes in the storage compartments, the vehicle operator has completely eliminated either having the tapes randomly spread throughout the automobile's interior or the necessity of having a separate carrying case placed on one of the vehicle's seats. If the vehicle operator wishes to retrieve a tape, he/she merely reaches up and pulls a tape which may then be placed in the tape player. A vehicle operator that places his/her tape in a systematic order will not even have to glance at the tape before it is inserted into the cassette player. The car storage system of the present invention, accordingly, eliminates the need of a vehicle operator to avert his/her eyes from the road during vehicle operation to find small items in the automobile. Any item may be retrieved without the necessity of having to stop paying attention to the road. The item may merely be pulled from the correct storage compartment using only touch.

It is, therefore, an object of the present invention to provide a car storage system which allows small items normally carried within an automobile to be stored in an easily accessible location.

It is another object of the present invention to provide a car storage system which may be mounted away from a vehicle's occupants so that seat space is not limited.

It is a further object of the present invention to provide a car storage system which is size adjustable in order to allow it to fit in a variety of automobiles.

It is still another object of the present invention to provide a car storage system which has a plurality of storage compartments which are accessible to the vehicle operator without necessitating the vehicle operator having to avert his/her eyes from the road.

It is even another object of the present invention to provide a car storage system with a storage member which performs as a carrying case once detached from the support member.

It is even a further object of the present invention to provide a car storage system which keeps cassette tapes and/or CD's out of direct sunlight.

Still other features and advantages of the present invention will become evident to those skilled in the art in light of the following.

BRIEF DESCRIPTION OF THE DRAWINGS

FIG. 3 is a front view showing the support member of the car storage system according to the preferred embodiment of the present invention.

FIG. 4 is a bottom view showing the support member of the car storage system according to the preferred embodiment of the present invention.

FIG. 6 is a front view showing the storage member of the car storage system according to the preferred embodiment of the present invention.

FIG. 7 is a bottom view showing the storage member of the car system storage according to the preferred embodiment of the present invention.

DETAILED DESCRIPTION OF THE PREFERRED EMBODIMENT

Figure 1:
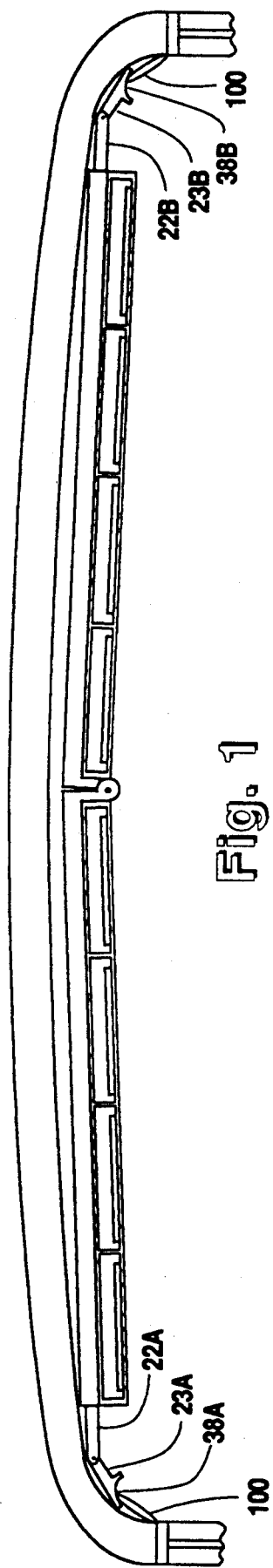
FIG. 1 is a front view showing the car storage system according to the preferred embodiment of the present invention mounted along the ceiling of a car roof.
Figure 5:
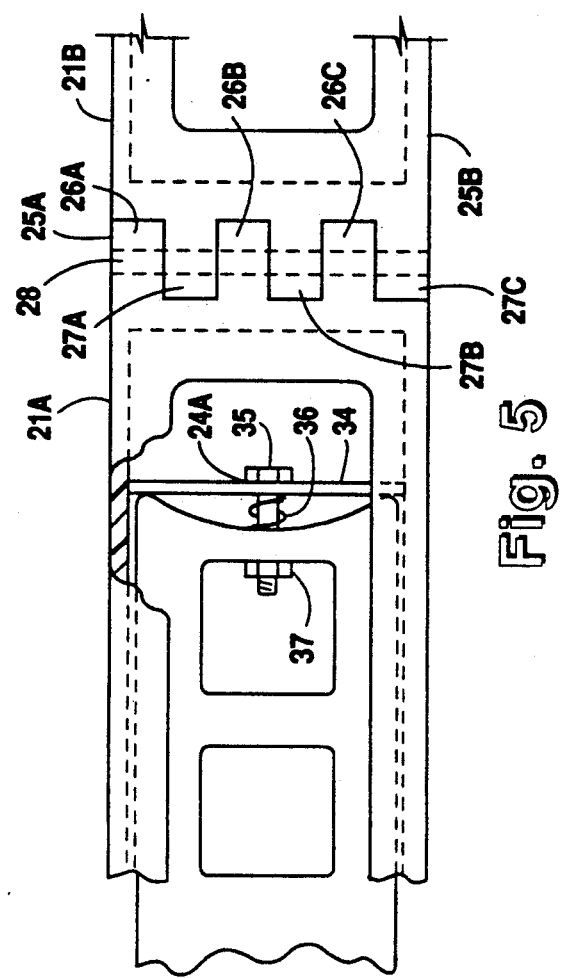
FIG. 5 is a partial bottom view of the support member showing the locking mechanism which makes the support member adjustable.

Referring to FIGS. 3, 4, 5, and 9, the support member of the car storage system of the present invention will be described. Support member 20 comprises sleeves 21A and B pivotally connected at one end. Support member 20 further comprises arms 22A and B slidably mounted within sleeves 21A and B, respectively, wherein arms 22A and B are provided at one end with pivotable flanges 23A and B, respectively, and at their opposite ends with locking mechanisms 24A and B, respectively.

The pivotal connection between sleeves 21A and B is created by coupling members 25A and B which are integral to and form part of sleeves 21A and B. Coupling members 25A and 25B extend perpendicularly from one end of sleeves 21A and 21B and terminate in alternately spaced circularly-shaped teeth 26A, 26B, 26C (hereafter 26A-C) and 27A, 27B, 27C (hereafter 27A-C) (See FIG. 5). Each tooth of teeth 26A-C and 27A-C is provided with a hole therethrough such that after teeth 26A-C and 27A-C are fitted together, they form a hinge which has passage 28. Thus, after all the teeth are lined up a pivot pin (not shown) may be fitted through passage 28, thereby, locking teeth 26A-C and 27A-C in place and pivotally connecting sleeves 21A and B together.

Furthermore, coupling members 25A and 25B are provided with slots 41 and 42, respectively, which serve as part of the mount for the storage member. The second part of the mount for the storage member is supplied by hooks 40 and 43 of sleeves 21A and 21B, respectively, which are positioned at the ends opposite from coupling members 25A and B. The use of slots 41 and 42 and hooks 40 and 43 to mount the storage member is described herein with reference to FIG. 10.

For the purposes of disclosure, only sleeve 21A and arm 22A will be described. However, it is to be understood that sleeve 21B and arm 22B are formed in a similar fashion and operate identically. Sleeve 21A is a rectangularly shaped segment comprised of upper member 29, lower member 30, side members 31 and 32 (see FIG. 9), and end member 47 (see FIGS. 3 and 4) which is integral to coupling member 25A. The inside portions of members 29-32 form opposing slots which serve as rails for arm 22A as it is moved within sleeve 21A. Upper and lower members 29 and 30 are further provided with elongated openings 33 and 34 which allow access to locking mechanism 24A of arm 22A. The end of sleeve 21A opposite to coupling member 25A further has a rectangular opening (not shown) which allows the insertion of arm 22A into the slots of sleeve 21A.

Arm 22A is also a rectangularly shaped member which fits through the opening at the unconnected end of sleeve 21A into the two opposing slots formed by the insides of members 29-32. The end of arm 22A held within sleeve 21A has a slight curvature (see FIG. 5) and is connected to locking mechanism 24A. Locking mechanism 24A comprises flexible bar 34, bolt 35, spring 36, and nut 37. To connect locking mechanism 24A to arm 22A, spring 36 is placed between arm 22A and flexible bar 34 with bolt 35 placed through the openings (not shown) in both flexible bar 34 and arm 22A. Nut 37 is then screwed onto bolt 35 to secure flexible bar 34 to arm 22A such that flexible bar 34 bends slightly inward. Although in the preferred embodiment locking mechanism 24A included a nut and bolt to hold the flexible bar in place, one of ordinary skill in the art will readily recognize that a T-shaped molded piece held on arm 22A by a clip could be substituted. Locking mechanism 24A operates by placing tension against side members 31 and 32 of sleeve 21A. The slight inward angle of flexible bar 34 provides a tension which locks arm 22A within sleeve 21A, but still allows arm 22A to be extended outwardly from sleeve 21A. However, the tension against sleeve 21A is sufficient to prevent arm 22A from unintentionally or unexpectedly retracting. To retract arm 22A, flexible bar 34 is pressed inward towards the curvature at the end of arm 22A. That action pulls the ends of flexible bar 34 away from side members 31 and 32, thereby, allowing arm 22 to be manually slid back further into sleeve 21A. The opposite end of arm 22A is provided with pivotable flange 23A which is used in conjunction with pivotable flange 23B to secure support member 20 to the ceiling of an automobile. Arm 22A terminates in alternately spaced teeth 45A-C (see FIG. 4.) while one end of flange 23A is furnished with alternately spaced teeth 46A-C which mesh with teeth 45A-C to form the connection point between arm 22A and flange 23A. Teeth 45A-C and 46A-C are provided with holes therethrough which line up and form a passage (not shown). The passage holds a pivot pin (not shown) which secures teeth 45A-C and teeth 46A-C together, thereby, connecting flange 23A to arm 22A. In the preferred embodiment, flange 23A is not pivotable beyond the completely horizontal position with respect to arm 22A shown in FIG. 3 and may only be pivoted below arm 22A to a point perpendicular to arm 22A. The opposite end of flange 23A is equipped with knife edge 38A which is used to secure flange 23A behind the molding of an automobile ceiling. Once inserted behind the molding, flange 23A is held in place and prevented from pivoting by the tension created against the molding by arm 22A held within sleeve 21A by locking mechanism 24A. Flange 23A is further supplied with lip 39 which, after knife edge 38A is inserted behind the molding, abuts the molding to prevent flange 23A from being over inserted and possibly causing damage to the molding.

Referring to FIGS. 6-9, the storage member of the car storage system of the preferred embodiment of the present invention will be described. Storage member 50 comprises storage sections 51 and 52 which in turn are comprised of individual storage compartments 53-68. Storage sections 51 and 52 are connected together in a manner similar to that of sleeves 21A and B of support member 20. That is, one end of each storage section (51 and 52) terminates in circularly-shaped teeth 69 and 70 and circularly-shaped teeth 71 and 72, respectively, which mesh together to form a pivotal connection point. Teeth 69 and 71 are aligned and a pivot pin (not shown) is inserted to connect them together. Similarly, teeth 70 and 72 are aligned and connected together using a second pivot pin (not shown). Unlike sleeve 21A and 21B, however, the connection point between the ends of storage sections 51 and 52 form cavity 73 (see FIG. 9) which is used to connect storage member 52 to support member 20. Positioned within cavity 73 are tabs 74 and 75 which are provided to form the connection point between support member 20 and storage member 50 (discussed herein with reference to FIG. 10).

Figure 8:
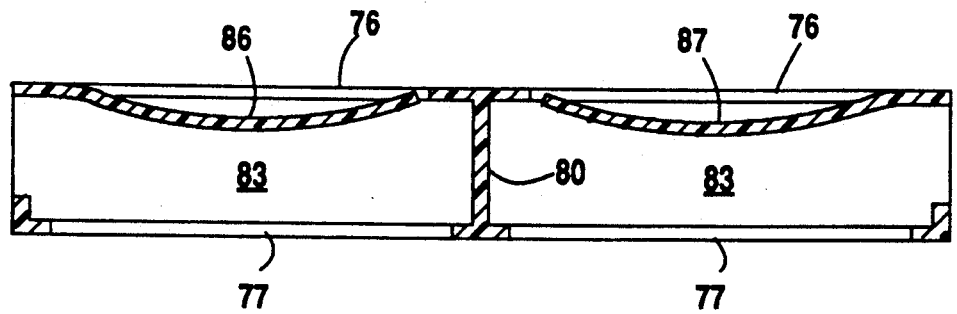
FIG. 8 is a cross-sectional side view showing individual storage compartments of the storage member of the present invention.
Figure 9:
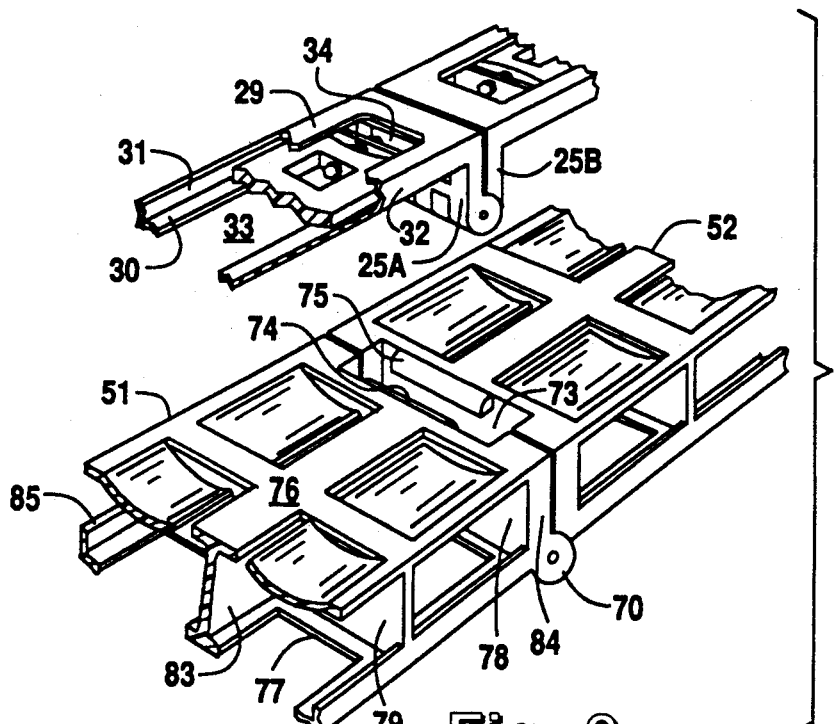
FIG. 9 is a perspective view showing the mounting of the storage member to the support member to form the car storage system according to the preferred embodiment of the present invention.

In the preferred embodiment, individual storage compartments 53-68 are formed in a grid-like structure by the wall members which comprise sections 51 and 52 (See FIGS. 8 and 9). In describing the individual storage compartments, only storage section 51 will be referenced, however, it is to be understood that section 52 is constructed similarly and functions identically. Storage section 51 comprises upper member 76, lower member 77, wall members 78-82, center wall member 83, and side wall members 84 and 85. Wall members 78-82 are equally spaced apart in the preferred embodiment and function in conjunction with center wall member 83 to separate upper member 76 from lower member 77 and to partition the space between upper member 76 and lower member 77 into equal compartments. To allow access to the compartments created by members 76-85, upper member 76, lower member 77, and side wall members 84 and 85 are produced with openings (see any of FIGS. 6-9). Although upper member 76 is afforded openings, these openings are covered with flexible covers (see e.g. 86 and 87 as shown in FIG. 8 and FIG. 9) which serve to hold an object placed in one of the compartments pressed firmly against the inside lip created in each of compartments 53-68 by lower member 77 and one of side wall members 84 or 85. Furthermore, upper member 76 extends slightly beyond wall member 82 in order to form tab 88A (described herein with reference to FIG. 10). In the preferred embodiment, the configuration of the storage compartments is best suited to the holding of cassette tapes. However, changes in the configuration of the storage compartments will allow other objects to be firmly secured. Thus, a person skilled in the art will readily recognize that changes in the configuration of the compartments which would allow CD's, mail, facial tissue, loose change, garage openers, maps, gloves, sunglasses, etc. will still fall within the scope of the present invention.

Figure 2:
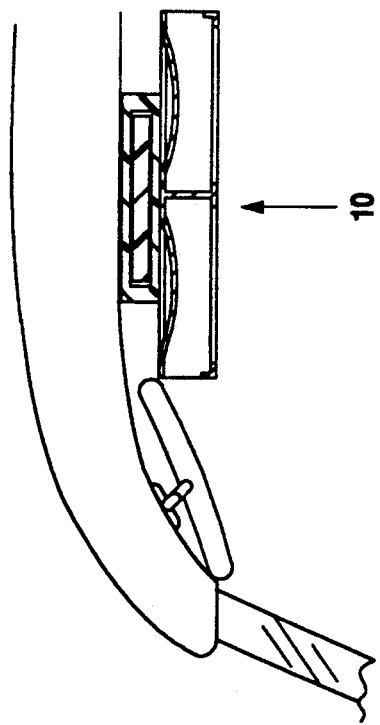
FIG. 2 is a side view showing the car storage system according to the preferred embodiment of the present invention mounted along the ceiling of a car roof.
Figure 10:
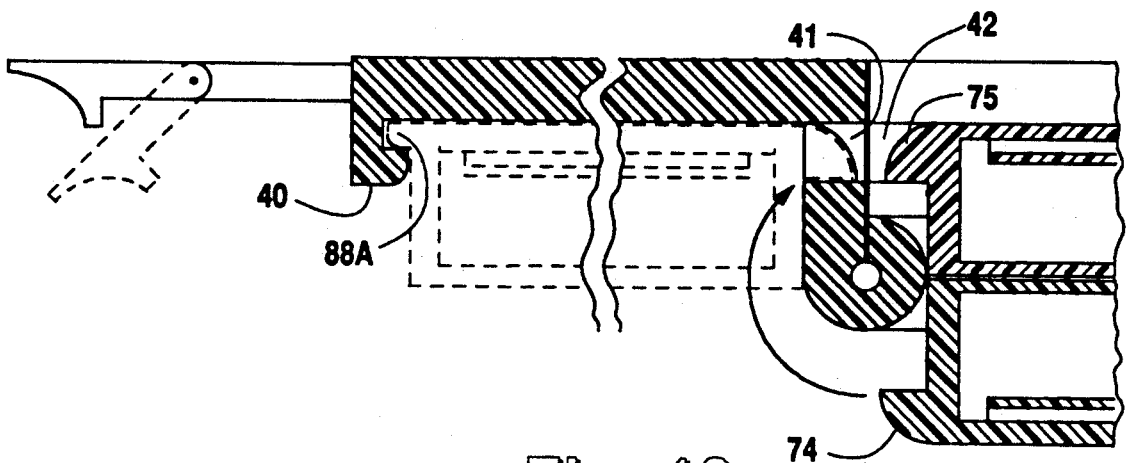
FIG. 10 is a cross-sectional side view showing the mounting of the storage member to the support member in order to form the car storage system according to the preferred embodiment of the present invention.

Referring to FIGS. 1, 2, and 10, the installation of the present invention along the ceiling of an automobile roof will be described. Support member 20 must first be mounted along the ceiling of the automobile. Arms 22A and 22B are extended until support member 20 is the same width as the automobile ceiling and flanges 23A and 23B will easily reach molding 100 (see FIG. 1). Flanges 23A and 23B are pivoted such that knife edges 38A and 38B may be slid behind molding 100, thereby, securing support member 20 along the car's ceiling. Flanges 23A and 23B are held in place and prevented from pivoting by the tension created against the molding by arms 22A and 22B held within sleeves 21A and 21B by locking mechanisms 24A and 24B. Once support member 20 is in place, storage member 50 must be mounted underneath. Mounting of storage member 50 is accomplished by first folding storage section 51 underneath storage section 52 (see FIG. 10). Storage sections 51 and 52 are pivotal about each other because of their connections along teeth 69 and 71 and teeth 70 and 72 by the two separate pivot pins. Slots 41 and 42, formed within coupling members 25A and B, respectively, provide the support attachments for one end of storage member 50. Tab 75 is slid within slot 42 contained in coupling member 25B (see FIG. 10). After tab 75 is in place, the end opposite from tab 75 is connected to support member 20 by hook 43. Similar to storage section 51, the upper member of storage section 52 extends slightly beyond the last spacer wall to form tab 88B as shown in FIG. 6. Hook 43 is flexible and allows tab 88B to slide past it and into the slot formed between hook 43 and the underside of sleeve 21B (see FIG. 3). Hook 43 then returns to its original position, thus, holding tab 88B and, thereby, storage section 52 in place. Once storage section 52 is in place, storage section 51 is pivoted completely around as shown by the arrow in FIG. 10 until tab 74 resides within slot 41 which is contained within coupling member 25A. Tab 88A of upper member 76 is then inserted as previously described within the slot between hook 40 and lower member 30 to finish the securing of storage member 52 to support member 20.

In place, car storage system 10 resides above the heads of the vehicle's occupants and may be placed such that it is easily accessible to a vehicle operator by securing it to the molding in a position directly behind the sun visor as shown in FIG. 2. Once car storage system 10 is affixed, cassette tapes, CD's, maps, gloves, sunglasses, nasal tissue, hand towels, or any other small item carried in an automobile may be secured out of the way, but still in a location which is readily accessible to a vehicle operator. Additionally, after storage member 50 has been removed from support member 20, it functions as a carrying case for the objects stored therein. However, if support member 20 is removed from the automobile with storage member 50 still attached, storage member 50 will still function as a carrying case.

From the foregoing description and illustration of this invention, it is apparent that various modifications can be made by reconfigurations or combinations to produce similar results. It is, therefore, the desire of the applicant not to be bound by the description of this invention as contained in this specification, but to be bound only by the claims as appended hereto.

I claim:

1. A portable overhead storage system for use in automobiles, comprising:
   support means mountable to the ceiling of an automobile, comprising:
   a first sleeve means and a second sleeve means pivotally connected together at respective ends, and
   a first arm means slidably mounted within said first sleeve means and a second arm means slidably mounted within said second sleeve means for providing size adjustability of said support means and further for providing a connection point between said support means and the ceiling of the automobile; and
   storage means mounted to said support means.

2. The car storage system according to claim 1, wherein said storage means is removably mounted onto said support means.

3. The car storage system according to claim 1, wherein said support means further comprises:
   first locking means connected to said first arm means and second locking means connected to said second arm means, said locking means locking said arm means within said sleeve means wherein extension of said arm means is permitted but retraction is prevented unless said locking means is disengaged; and
   first flange means pivotally connected to said first arm means and second flange means pivotally connected to said second arm means, said first and second flange means being mountable behind the molding of the automobile ceiling for securing said support means to the ceiling.

4. The car storage system according to claim 1, wherein said storage means comprises a first storage section pivotally connected to a second storage section wherein said first and second storage sections are removably mounted on said first and second sleeve means.

5. The car storage system according to claim 4, wherein said first and second storage sections comprise a plurality of individual storage compartments.

6. The car storage system according to claim 5, wherein said pivotal connection between said first and second sleeve means contains slot means and the opposite ends of said first and second sleeve means contains hook means.

7. The apparatus according to claim 6, wherein the ends of said first and second storage sections contain tab means which engage said slot means and hook means of said first and second sleeve means to provide a removable connection between said first and second sleeve means and said first and second storage sections.

8. The car storage system according to claim 1, wherein said storage means functions as a carrying case once removed from the automobile.

* * * * *